Patented Dec. 22, 1931

1,837,326

UNITED STATES PATENT OFFICE

GEORG KRÄNZLEIN, HEINRICH VOLLMANN, HEINRICH GREUNE, AND ARTHUR WOLFRAM, OF HOCHST-ON-THE-MAIN, GERMANY, ASSIGNORS TO GENERAL ANILINE WORKS, INC., OF NEW YORK, N. Y., A CORPORATION OF DELAWARE

CONDENSATION PRODUCTS OF THE ANTHRONE SERIES AND PROCESS OF PREPARING THEM

No Drawing. Application filed April 18, 1928, Serial No. 271,116, and in Germany April 3, 1926.

Our present invention relates to condensation products of the anthrone series and to processes of preparing them.

We have found that a benzanthrone substituted in the Bz. nucleus can be produced by condensing an anthrone compound, for instance an anthrone, anthranol or oxanthranol by means of an acid agent with an α-β-unsaturated carbonyl compound of the general composition:

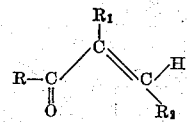

wherein R stands for alkyl or aryl or hydroxyl or alkoxyl; $R_1$ stands for any univalent residue, for instance hydrogen, halogen, hydroxyl, alkoxyl, alkyl, aryl, aralkyl, acyl, aroyl, carboxylic ester or the like and $R_2$ stands for hydrogen, halogen, hydroxyl, alkoxyl, alkyl, aryl, carboxyl or carboxylic ester.

The reaction between anthrone (or anthranol) for instance and the said α-β-unsaturated carbonyl compounds takes place in such a manner that primarily an addition of the anthrone to the double linkage occurs with formation of a colorless, well crystallizing intermediate product of the type illustrated by the Formulæ I and II following hereafter, which intermediate product, in many cases, has pharmaceutical properties. Some of these addition products have already been prepared by Meerwein (see Journal für praktische Chemie vol. 97, pages 284 ff.). Some of these addition products are new compounds. They correspond with the following formula:

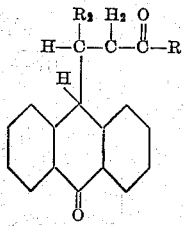

wherein $R_1$ represents one of the groups aryl and hydroxy, $R_2$ represents hydrogen or one of the groups alkyl and carboxyl and the two benzene nuclei of the anthraquinone residue may contain further substituents.

Now, contrary to the statement by the above mentioned author Meerwein that the said addition compounds, when heated with concentrated acids, are re-split up into their components, we have found that from these addition compounds when working in a suitable manner, i. e. by using an acid condensing agent, there may in all cases be obtained the corresponding benzanthrones by the closure of the ring; as may be illustrated by the following formulæ:

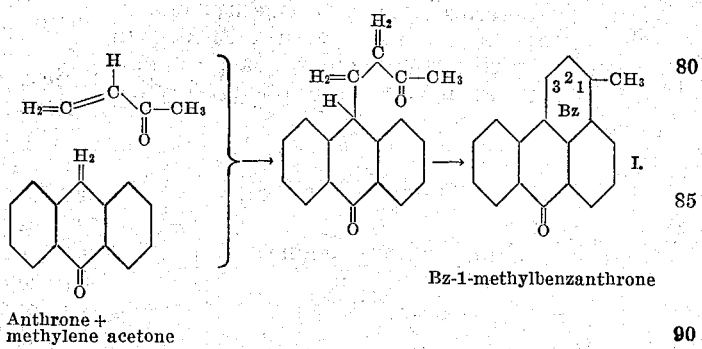

Anthrone + methylene acetone

Bz-1-methylbenzanthrone

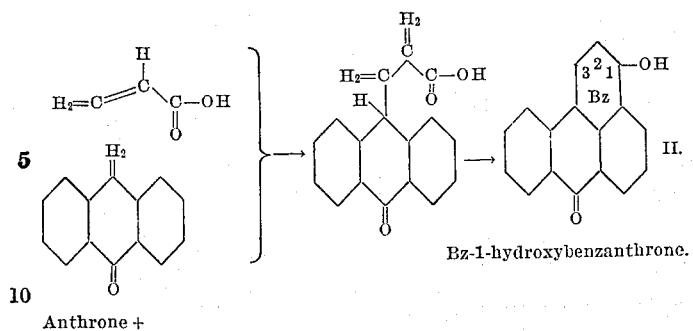

Anthrone + acrylic acid

The condensation to a benzanthrone may be effected either by isolating the addition compounds (Type I and II) and closing the ring by a second operation, or by performing the addition and the closure of the ring by a single operation.

The same results may be obtained when using in the process above described such compounds of the type referred to, in which the α-β double-linkage has been changed for a simple one by the addition of water or hydrogen halide. Thus for instance methyleneacetone

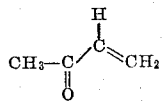

may be substituted by ketobutanol

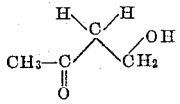

which on its part is easily transformed into methyleneacetone. By elimination of water, there is obtained the same methylbenzanthrone by condensation with anthrone in a solution with sulfuric acid. In a quite analogous manner behaves the phenylvinylketone:

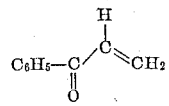

and the β-chlorpropionphenone:

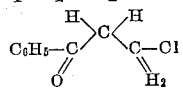

both of which yield one and the same phenylbenzanthrone.

When condensing maleic acid or fumaric acid (according to the general structural formula: $R=OH$, $R_1=H$, $R_2=COOH$ stated at the beginning of the specification) with an anthrone one carboxyl group is split off while closing the ring by means of aluminum chloride so as to form the benzanthrone. The course which the reaction takes when for instance maleic anhydride is used, may be explained by the following formulae:

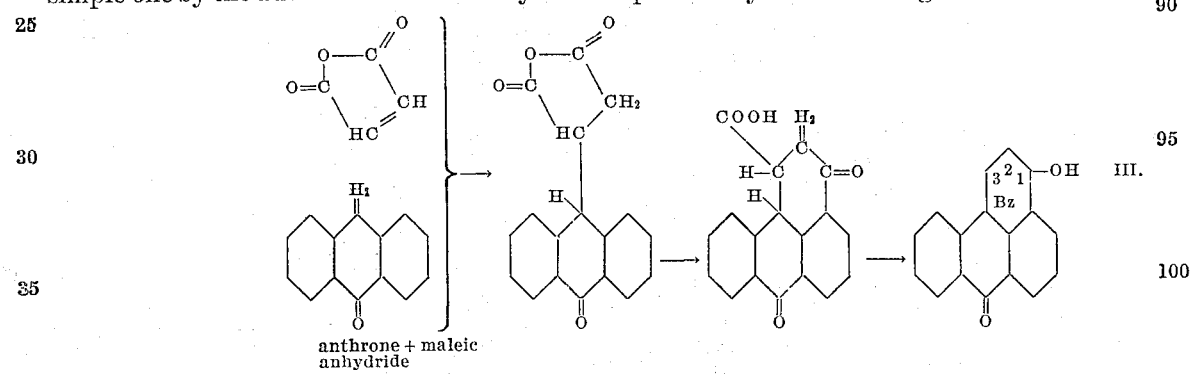

anthrone + maleic anhydride

The benzanthrone derivatives thus obtained, often with a very good yield, show the properties which are characteristic for benzanthrone and they are valuable parent materials for the manufacture of dyestuffs.

The following examples serve to illustrate our invention but they are not intended to limit it thereto; the parts are by weight:

1. 100 parts of anthrone are heated to boiling on the reflux apparatus with 200 parts of methyleneacetone to which a few drops of piperidine have been added. The anthrone becomes gradually dissolved and finally the condensation product still separated in boiling heat. By recrystallization from toluene thick, colorless prisms are obtained which melt at 173° C.

On heating the almost colorless solution of the product in sulfuric acid of 60° Bé., condensation occurs whereby the solution assumes a red color and Bz-1-methylbenzathrone is formed which is then precipitated in the form of yellow flakes by pouring the sulfuric solution into water. The methylbenzanthrone thus obtained crystallizes from glacial acetic acid as yellow needles which melt at 165° C.

2. 30 parts of anthrone are heated, while stirring, with 30 parts of β-chlorpropiophenone. At 90° C. to 100° C. evolution of hydrochloric acid sets in. After heating for a short time to 150° C., the condensation is complete. The addition compound thus obtained crystallizes as colorless shining prisms melting at 186° C. When treated with sulfuric acid a ring closure takes place whereby Bz-1-phenylbenzanthrone is produced which crystallizes as yellow needles melting at 183° C.

3. (a) 19 parts of anthrone are heated together with 20 parts of para-methoxy-β-chloropropionephenone

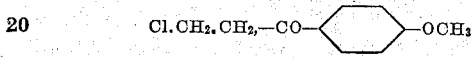

(the latter has its melting point at 64° C. and can be prepared from β-chloropropionylchloride and anisole by the action of aluminium chloride). At 100° C. to 120° C. a strong evolution of hydrogen chloride sets in. When the evolution of hydrogen chloride is finished the mass is diluted with 100 parts of hot alcohol. The condensation product thus formed precipitates in the form of colorless crystals which after re-crystallization from alcohol melt at 181° C.

(b) 20 parts of the intermediate product so prepared are heated to about 100° C. with 150 parts of sulfuric acid of 62° Bé. until the solution which is at first colorless has assumed an intense bluish-red color. On isolating in the usual manner, a body, probably the Bz-1-para-methoxyphenylbezanthrone, is obtained which crystallizes from glacial acetic acid in the form of yellow needles melting at 186° C. The color of its solution in concentrated sulfuric acid is bluish-red with a brownish-red fluorescence.

4. 194 parts of anthrone are molten and into the melt are introduced at about 160° C. 100 parts of maleic anhydride of the formula

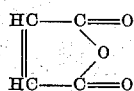

The reaction which now sets in is apparent from the rise of the temperature. The mixture is heated for some minutes to 240° C., diluted by the addition of 600 parts by volume of hot nitrobenzene and then allowed to cool. The condensation product so obtained crystallized in the form of colorless large flat prisms melting at 215° C. and has probably the formula indicated in the description under III.

100 parts of the intermediate product thus produced are suspended in 1000 parts by volume of nitrobenzene, and to this suspension are added 200 parts of powdered dry aluminium chloride. The solution is gradually heated on the water-bath until it has assumed a deep reddish-violet color which is obtained after a short time. Water is then added thereto and the nitrobenzene is blown off with steam.

Thus the Bz.1-hydroxy benzanthrone is obtained in the form of reddish-brown flakes dissolving in an aqueous alkali solution, or in concentrated sulfuric acid to a reddish-violet solution. Its solution in concentrated sulfuric acid shows an intense red fluorescence. The Bz.1-hydroxy benzanthrone crystallizes from high-boiling solvents in the shape of reddish-orange needles of the melting point 317° C.

5. 200 parts of anthrone are mixed with 400 parts of β-chloropropionic acid and this mixture is stirred for five hours at 130° C. to 150° C. hydrochloric-acid gas being evolved. Water is then added to the mixture and the separated oily product is well washed. The excess of β-chloropropionic acid can be recovered by evaporating the aqueous solution.

The separated oily product is extracted with an aqueous ammonia or dilute sodium carbonate solution, filtered, and from the solution thus obtained which, if required, has been clarified by means of a small quantity of animal charcoal, the β-anthronylpropionic acid is separated in the form of a clear, at first oily product.

On re-crystallizing the β-anthronylpropionic acid from dilute methanol or dilute glacial acetic acid it is obtained as colorless, brilliant needles or laminæ melting at 181° C.

The solution of β-anthronylpropionic acid in concentrated sulfuric acid is faintly yellow. On heating the solution to about 150° C., it assumes a pure carmine red color with a red fluorescence, while the closure of the ring to Bz-hydroxy benzanthrone and at the same time sulfonation takes place.

By melting the β-anthronylpropionic acid with sodium-aluminium chloride at about 180° C. the Bz.1-hydroxybenzanthrone is obtained, which is soluble in alkalies to a violet solution. The closure of the ring can also be effected by heating with phosphorous oxychloride.

6. 194 parts of anthrone are intimately mixed with 86 parts of crotonic acid, and the mixture is heated with 2 parts of piperidine in a closed vessel to 200° C. for five hours, while slowly stirring. Thus a light yellow resin is obtained which is afterwards dissolved in hot methyl alcohol. On adding hot water to the solution and allowing it to stand for some time, the β-anthronyl-β-methylpropionic acid is precipitated as colorless prisms melting at 160° C.

Into 300 parts of chlorosulfonic acid are caused to run, while cooling and stirring, 700 parts of glacial acetic acid. Thereupon 120 parts of β-anthronyl-β-methylpropionic acid are added to the mixture. The temperature is raised to 80° C. in the course of an hour and then allowed to fall again slowly. The melt is decomposed with ice and diluted with water, boiled again and filtered. The residue is once more boiled in much water and then dissolved in dilute hot caustic soda solution, wherein it is soluble to a bluish-violet solution. On acidifying the filtered solution yellowish-brown flakes of Bz.1-hydroxy-Bz.-3-methylbenzanthrone are obtained, crystallizing from a mixture of glacial acetic acid and nitrobenzene in the form of yellowish-brown needles melting at 287° C. The compound dissolves in concentrated sulfuric acid to a reddish-violet solution.

7. 198 parts of anthrone are intimately mixed with 148 parts of cinnamic acid, and the mixture is heated together with a small quantity, about 2–3 parts, of piperidine, suitably in a sealed vessel, while slowly stirring for 6 hours to 170° C.–180° C. the temperature being measured in the melt. Thus a light yellow resin is produced which soon solidifies. This resin is dissolved in boiling xylene, and on cooling the solution, colorless prisms of β-anthronyl-β-phenylpropionic acid are obtained melting at 197° C. (cf. Meerwein "Journal für praktische Chemie" volume 97, page 286, 1928).

Into 600 parts of chlorosulfonic acid are caused to run, drop by drop, while cooling with ice and well stirring, 900 parts of glacial acetic acid, and to this mixture are added at about 40° C. 200 parts of β-anthronyl-β-phenylpropionic acid. At about 60° C. the solution begins to change its color and becomes violet with a red hue. The temperature is for a short time raised in the course of an hour up to 80° C. and then allowed to go down again slowly. After the melt has been poured on ice and diluted with water, it is boiled up for some time and filtered by suction. Boiling is once more repeated, and thus a yellowish-brown product is obtained, which for being purified, is dissolved in dilute hot caustic soda solution, wherein it is soluble to a violet solution. The filtered alkaline solution is acidified and then yields orange-colored flakes constituting pure Bz.-1-hydroxy-Bz.-3-phenylbenzanthrone. The compound crystallizes from glacial acetic acid or nitrobenzene in the shape of orange-colored needles which melt, but not sharply, at 320° C. The color of its solution in concentrated sulfuric acid is when seen in a thick layer blue, in a thin layer red. In a reflected light the solution in sulfuric acid also appears to be red-colored.

8. 210 parts of α-oxyanthrone and 100 parts of maleic anhydride are fused, while stirring, at 200° C. to 220° C. for about 5 minutes, the molten mass is then diluted with 1000 parts of glacial acetic acid, while hot, and allowed to cool. The condensation product separates as shining needles of a faintly greenish yellow color. It has a melting point of 247° C. The product dissolves in concentrated sulfuric acid to a faintly yellow solution which, on heating, turns red with an intense moss-green fluorescence.

If the above described addition product is heated for a short time to 100° C. to 130° C. with ten times the quantity of sodium aluminium chloride, a ring closure takes place whereby the Bz-1-4-hihydroxybenzanthrone is formed. When decomposing the molten mass with water, the last mentioned compound is obtained in the form of orange flakes which dissolves in concentrated sulfuric acid and in aqueous alkali to a red solution with a brownish-red fluorescence.

9. By treating β-chloranthrone with maleic anhydride in the same manner as indicated in the foregoing example, a product is obtained which crystallizes as colorless prisms, melting at 243° C. By treating it with an acid condensing agent, such as concentrated sulfuric acid or aluminium chloride, a ring closure is effected whereby a monochlor-Bz-1-hydroxybenzanthrone is produced.

10. 50 parts of chlorpropiophenone are heated with 37 parts of β-methylanthrone to 80° C. to 90° C., while stirring. At this temperature condensation occurs with a strong evolution of HCL. The evolution of the gas ceases after 10–15 minutes and separation of the condensation product sets in. There are then added 200 parts of glacial acetic acid and the whole is stirred for a further short time. After cooling, the product is filtered with suction washed with glacial acetic acid and alcohol and then recrystallized from glacial acetic acid. Thus colorless shining prisms are obtained which melt at 191° C., their solution in concentrated sulfuric acid is also colorless. On heating, the solution assumes a carmin red color with a brownish-red fluorescence and a ring closure takes place whereby a benzanthrone derivative is produced.

11. 30 parts of β-chloranthrone are heated for a short time to 90° C. to 100° C. together with 40 parts of p-brom-β-chlorpropiophenone (the latter being obtained from β-chlorpropionyl chloride and monobromobenzene), and thus the condensation is effected with evolution of hydrochloric acid. By recrystallizing the mass from glacial acetic acid, colorless flat crystals are obtained, melting at 222° C. to 223° C. which can be treated with concentrated sulfuric acid so as to effect a ring closure whereby a corresponding benzanthrone derivative is produced.

It is to be understood that, in the process hereinafter claimed, one may use instead of compounds of the general Formula I

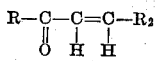

likewise compounds of the general Formula II

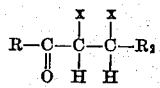

wherein one $x$ represents hydrogen and the other $x$ represents one of the substitutents halogen and hydroxyl, which latter compounds easily can be converted into compounds of general Formula I by splitting off hydrogen halide, or water, and therefore are to be considered as equivalents of compounds of general Formula I. It is furthermore to be understood that in the following claims the term "an anthrone compound" comprises also the isomeric anthranol compounds and the oxanthranols which react in the same manner.

This application contains subject matter in common with our co-pending application Ser. No. 180,055 filed March 31, 1927, and is to be regarded as a continuation-in-part of said application.

We claim:

1. Process which comprises heating at a temperature of from about 100° C. to about 250° C. an anthrone compound, with a carbonyl compound of the general formula

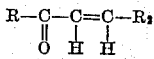

wherein R represents one of the group aryl and hydroxyl, $R_2$ represents hydrogen or one of the groups alkyl, or carboxyl.

2. Process which comprises heating at a temperature of from about 100° C. to about 250° C. an anthrone compound, with a carbonyl compound of the general formula:

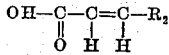

wherein $R_2$ represents hydrogen or a methyl group.

3. As new products, the compounds of the following probable formula:

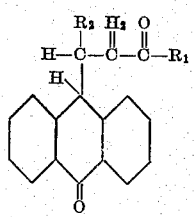

wherein $R_1$ represents one of the groups aryl and hydroxy, $R_2$ represents hydrogen or one of the groups alkyl and carboxyl and the two benzene nuclei of the anthraquinone residue may be substituted by halogen, alkyl or hydroxyl, said products being well crystallizing compounds, most of them having pharmaceutical properties.

4. As new products, the compounds of the following probable formula

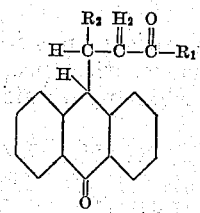

wherein $R_1$ represents one of the groups aryl and hydroxy and $R_2$ represents hydrogen or one of the groups alkyl and carboxyl said products being well crystallizing compounds, most of them having pharmaceutical properties.

5. As new products, the compounds of the following probable formula

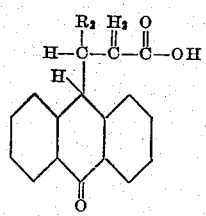

wherein $R_2$ represents hydrogen or a methyl group; said products being well crystallizing compounds, having pharmaceutical properties.

6. As a new product, the compound of the following probable formula:

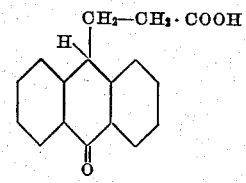

forming when recrystallized from dilute methanol, colorless needles or laminæ, melting at 181° C. and having pharmaceutical properties.

7. The process which comprises heating in a closed vessel for five hours at a temperature of about 200° C. anthrone with a carbonyl compound of the general formula:

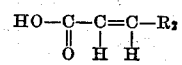

wherein $R_2$ represents hydrogen or a methyl group, in the presence of a small quantity of pyridine.

8. As a new product the compound of the following probable formula:
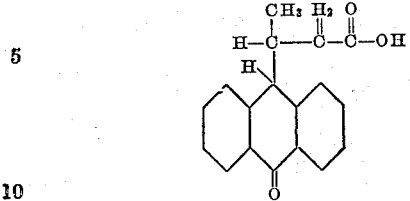
forming colorless prisms, melting at 160° C. and having pharmaceutical properties.
In testimony whereof, we affix our signatures.
GEORG KRÄNZLEIN.
HEINRICH VOLLMANN.
HEINRICH GREUNE.
ARTHUR WOLFRAM.